United States Patent [19]

Ogawa et al.

[11] Patent Number: 5,387,007
[45] Date of Patent: Feb. 7, 1995

[54] GAS GENERATOR OF THIN-WALLED STRUCTURE

[75] Inventors: Akihisa Ogawa; Osamu Muramatsu, both of Hyogo, Japan

[73] Assignee: Daicel Chemical Industries, Ltd., Japan

[21] Appl. No.: 983,562

[22] PCT Filed: Jun. 22, 1992

[86] PCT No.: PCT/JP92/00792
§ 371 Date: Mar. 29, 1993
§ 102(e) Date: Mar. 29, 1993

[87] PCT Pub. No.: WO93/00233
PCT Pub. Date: Jan. 7, 1993

[30] Foreign Application Priority Data

Jun. 21, 1991 [JP] Japan .................. 3-150366

[51] Int. Cl.⁶ .............................. B60R 21/28
[52] U.S. Cl. ..................... 280/740; 280/736; 102/530; 422/166
[58] Field of Search ........... 280/740, 741, 736, 728 R; 102/530, 531; 422/164, 165, 166

[56] References Cited

U.S. PATENT DOCUMENTS

| | | | |
|---|---|---|---|
| 3,985,076 | 10/1976 | Schneiter et al. | 280/741 X |
| 4,278,638 | 7/1981 | Nilsson et al. | 422/166 |
| 5,062,367 | 11/1991 | Hayashi et al. | 102/530 |
| 5,100,174 | 3/1992 | Jaskon et al. | 280/741 |
| 5,139,280 | 8/1992 | Cord et al. | 422/165 X |
| 5,149,129 | 9/1992 | Unterforsthaler et al. | 280/741 |

FOREIGN PATENT DOCUMENTS 2625961 7/1989 France .
152639 of 1980 Japan .
155857 of 1990 Japan .

Primary Examiner—Margaret A. Focarino
Assistant Examiner—Christopher P. Ellis
Attorney, Agent, or Firm—Weingram & Zall

[57] ABSTRACT

The gas generator according to the present invention is characterized by a combustion chamber formed with a combustor cup (14) having an annular top wall fixed at an inner edge portion thereof to a circumferential edge of a top wall of a central cylindrical holder (4) by riveting (28). A combustor plate (16) is welded at an outer edge thereof to an inner edge portion of a longitudinal extension of the combustor cup (14), and at an inner edge thereof to a bottom edge portion of the holder, so as to close the combustion chamber. A diffuser (12) is provided to cover the top wall of the central cylindrical holder (4) and the top wall of the combustor cup to form a double wall of the combustion chamber. A flange extends from the longitudinal extension of the combustion cup, the flange being welded to the inner wall of the extended portion of the diffuser to form a filter/cooling chamber.

20 Claims, 1 Drawing Sheet 5,387,007

GAS GENERATOR OF THIN-WALLED STRUCTURE

BACKGROUND OF THE INVENTION

1. Field of the Invention

The present invention relates to a gas generator having a thin-walled structure for an expandable air bag for protecting the occupant(s) of an automobile, and more particularly to an improvement in a housing of a gas generator suitably incorporated in a steering wheel to protect a driver of a passenger car when the collision of the car occurs.

2. Background of the Invention

As generally known, an air bag is a conventional safety device that is provided in a passenger car to protect a driver or passengers from an impact occurring when the car crashes. It comprises an air bag, and a gas generator for inflating the air bag in a very short period of time.

This gas generator has, as main constituent elements, a centrally positioned igniter in which a squib/enhancer is held, a cylindrical combustion chamber, formed so as to surround the igniter, housing gas generants therein, and a cross-sectionally rectangular filter/coolant chamber formed axially about the combustion chamber so that a gas generated in the combustion chamber passes through a filter and a coolant and flows through gas outlet ports formed in the side wall of the filter/coolant chamber and into an air bag.

Various types of structures of a housing for forming a combustion chamber and a filter/coolant chamber in such a gas generator have heretofore been proposed.

For example, Japanese Patent Publication-A No. 155857/1990 proposes a gas generator in which a combustion chamber is formed by a combination of a bottomed cylindrical portion of a housing body and a cover member welded to an opened part of this cylindrical portion so as to minimize the dimensions and weight of the gas generator.

Japanese Patent Publication-A No. 152639/1980 discloses a gas generator of a thin-walled structure formed so as to reduce the weight of a casing, in which a combustion chamber and a filter chamber are formed by a combination of a central cylinder in which an igniter is held, a cover, and an S-shaped casing. Outlet ports of the filter chamber (expansion chamber) being made in the form of slits by punching an extended portion of the casing.

However, when any of these conventional gas generators of a thin-walled structure are incorporated in a steering wheel of an automobile, safety problems arise since the wall of the housing which faces a driver consists of one thin plate covering a combustion chamber. Moreover, another disadvantage is that an assembly line for such gas generators, and the relative equipment used becomes complicated since the sealing of housings for the gas generants is done by welding.

An object of the present invention is to provide a gas generator of a weight-reduced, thin-walled structure having a housing of improved strength, capable of sealing gas generants by a non-welding method, which is advantageous with respect to the manufacturing equipment required.

SUMMARY OF THE INVENTION

Namely, the present invention relates to a gas generator of a thin-walled structure, having a central cylindrical holder 3 in which a squib/enhancer is housed, a combustion chamber surrounding the holder and holding gas generants therein, a filter/coolant chamber formed annularly so as to surround the combustion chamber adapted to allow the entry thereinto of a gas from the combustion chamber, and gas outlet ports from said filter/coolant chamber through which the gas may enter into an air bag. The apparatus of the present invention is characterized in that the combustion chamber 10 is formed with a combustor cup 14 having an annular top wall fixed at an inner edge portion thereof to a circumferential edge of a top wall of the central cylindrical holder 4 by riveting. At the lower end of the combustion chamber 10, a combustor plate 16 is welded at an outer edge thereof to an inner edge portion of a longitudinal extension of the combustor cup, and the combustor plate 16 is welded at an inner edge thereof to an edge portion of the central cylindrical holder 3, so as to close the combustion chamber. A diffuser 12 is provided to cover the top wall of the combustion chamber whereby a double wall for the combustion chamber is formed. An extended portion of the diffuser and the flange at the outer circumference of the combustor cup form the filter/coolant chamber, a free end portion of the flange at the outer circumference of the combustor cup being welded to the inner wall of the extended portion of the diffuser. The outlet ports for a gas flowing from the filter/coolant chamber are provided in the extended portion of the diffuser.

In the gas generator according to the present invention, a circular plate constituting a diffuser is laminated on the annular top wall of the combustion cup and the top wall of the combustion chamber to form a double wall for the combustion chamber. Therefore, the combustion chamber is doubly constructed, and an advantageous effect concerning the safety of the device is obtained. Since an expansion chamber (filter/coolant chamber) is formed by a combination of an extended portion of the diffuser and a flange at the outer circumference of the combustor cup, press working can be utilized, so that this part can be produced more easily and more inexpensively than by forging. In order to form a housing of the gas generator according to the present invention, a central holder has a combustor plate (cover member) which is welded thereto. The outer circumferential portion of the combustor plate is welded to a longitudinal extension of the combustor cup to form a combustion chamber. Gas generants are placed in this combustion chamber. An upper end portion of the combustor cup is then bent by press working and fastened to a head portion of a central holder by riveting so as to seal the gas generants in the combustion chamber by a non-welding method.

According to the housing structure of the present invention, the weight thereof can be reduced owing to the employment of a thin-walled structure of aluminum and the like, which can be produced by press working. Moreover, the gas generants can be sealed by a non-welding method. This enables an assembly line, and the equipment used, to be simplified.

When the housing structure of the gas generator according to the present invention is employed, the following effects can be obtained:

(1) The portion of the combustion chamber facing the passengers of an automobile is doubly formed, so that the gas generator is advantageous with respect to the safety thereof.

(2) Since the sealing of the gas generants can be done by a non-welding method, an assembly line and the equipment used can be simplified.

(3) Owing to the thin-walled structure, the weight of the gas generator can be reduced, and, since press working can be employed, this gas generator can be manufactured more efficiently and more inexpensively than a gas generator manufactured by forging.

BRIEF DESCRIPTION OF THE DRAWINGS

The invention will be described with reference to the accompanying drawings in which.

DETAILED DESCRIPTION

Figure 1:
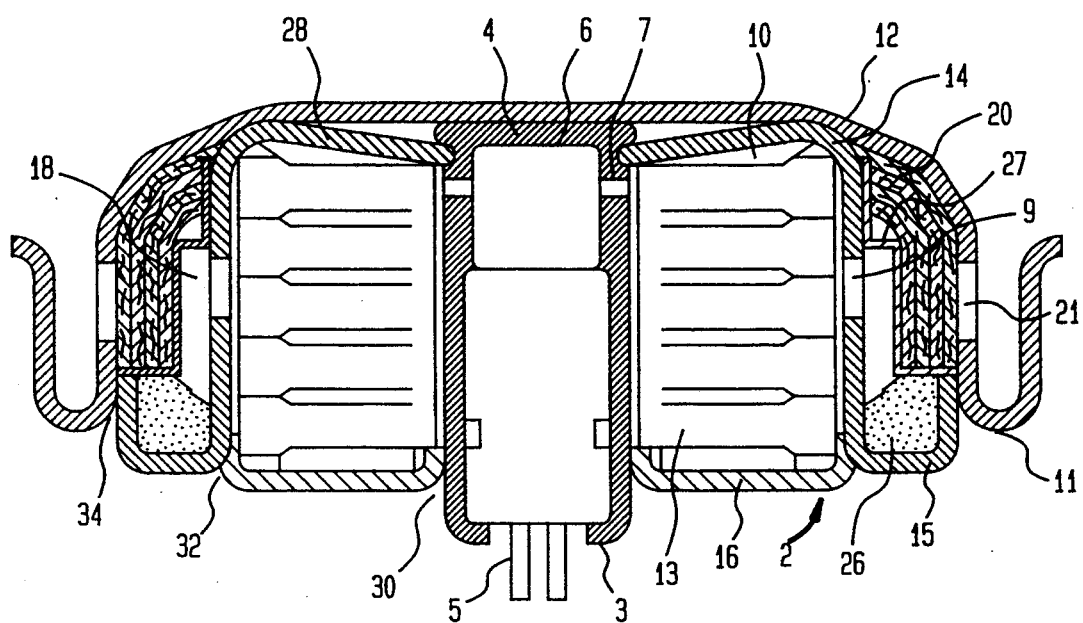
FIG. 1 is a schematic longitudinal section of an embodiment of the gas generator according to the present invention.

The details of the present invention will now be described on the basis of an embodiment thereof shown in the drawing.

FIG. 1 is a sectioned side elevation of the gas generator according to the present invention for an air bag for protecting the occupants of an automobile.

A gas generator 2 covered at its upper portion with a folded expandable air bag (not shown) cooperates with a collision sensor (not shown) to form a safety device for protecting the occupants of an automobile. This safety device is held in a steering wheel of an automobile.

The gas generator 2 has a central cylindrical holder 4 housing a squib/enhancer in the central portion thereof. After the squib/enhancer has been inserted in the holder 4, the lower end portion 3 of the holder is caulked (shown by a reference numeral 3) and connected to a collision sensor through conductors 5. The inner circumferential edge of an annular combustor plate (cover member) 16, which forms a bottom wall of a combustion chamber 10, is then welded to the outer circumferential edge of the lower end portion of the holder 4 at 30. The outer circumferential edge of annular combustor plate 16 is attached to the inner circumferential portion of a longitudinal extension of unprocessed cylindrical combustor cup 14, at 32 to form the combustion chamber 10, in which a required number of disc type gas generants 13 are positioned. The upper end portion of the combustor cup 14 is then bent by press working and fastened to the head portion of the central holder 4 by riveting 28 to seal the gas generants in the combustion chamber 10. A disc type diffuser 12 having an extended portion 11 is laminated on the top walls of the central holder 4 and combustor cup 14 thus formed, so that this portion of the housing of the combustion chamber is doubly formed. The extended portion 11 of this diffuser 12 and a flange 15 extending from the longitudinal extension of the combustor cup 14 forms a filter/coolant chamber (expansion chamber) 18 in which a filter and a coolant are provided. The outer circumferential edge of the flange 15 is welded to the inner circumferential edge of the lower end portion of the downwardly suspended extended portion of the diffuser 12, at 34. A combustion gas is produced from the gas generants 13 ignited by an igniter 6 in the holder 4 through the openings 7 provided in the circumferential wall of the holder. The generated gas flows into the expansion chamber 18 through a plurality of communication ports 9 provided in the longitudinal extension of the combustor cup 14, and passes through a coolant 26 and a filter 20. The resultant gas flows out of the gas generator through a plurality of gas outlet ports 21 and into an air bag to expand the same instantaneously. A retainer 27 is provided between the coolant 26 and filter 20 so that gas flow is directed first upon the coolant 26 and then passes through the filter 20.

In the housing of the gas generator according to the present invention, the central cylindrical holder 4, combustor plate 16, combustor cup 14 and diffuser 12 are joined to one another via annular welding seams 30, 32, 34 by electron beam welding or laser beam welding, whereas the top wall of the combustor is attached by riveting 28 to the central holder 4 after the completion of the insertion of the gas generant 13 into the combustor cup 14.

What is claimed is:

1. A gas generator of a thin-walled structure, having a central cylindrical holder in which a squib or enhancer is housed, a combustion chamber surrounding said holder and holding gas generants therein, a filter and coolant chamber formed annularly so as to surround said combustion chamber, and adapted to allow the entry thereinto of a gas which has passed through openings thereof communicating with said combustion chamber, and gas outlet ports formed at said filter and coolant chamber and through which the gas which has passed through a filter and a coolant rushes into an air bag, characterized in that said combustion chamber (10) is formed with a combustor cup (14) having an annular top wall fixed at an inner edge portion thereof to a circumferential edge of a top wall of said central cylindrical holder (4) by riveting, a combustor plate (16) being welded at an outer edge thereof to an inner edge portion of a flange at an outer circumference of said combustor cup, and at an inner edge thereof to an opposite edge portion of said holder, so as to close said combustion chamber, a diffuser (12) being provided so as to cover said top wall of said central cylindrical holder and a top wall which continues therefrom of said combustor cup, whereby a double wall for said combustion chamber is formed, an extended portion of said diffuser and said flange at the outer circumference of said combustor cup forming said filter and coolant chamber, a free end portion of said flange at the outer circumference of said combustor cup being welded to the inner wall of said extended portion of said diffuser, said outlet ports for a gas flow from said filter and coolant chamber being provided in said extended portion of said diffuser.

2. A gas generator comprising:

a housing having a top portion, a bottom portion, an igniter means mounted therein and means for communicating with the interior of said housing;

a combustion chamber surrounding said housing, said combustion chamber formed by a top wall and a bottom wall, said top wall having an inner end and an outer end, said inner end affixed to said top portion of said housing and said outer end extending to form a flange portion, said bottom wall having an inner edge and an outer edge, said inner edge affixed to said bottom portion of said housing and said outer edge affixed to said flange portion, said combustion chamber communicating with said communicating means;

a diffuser member positioned to cover said top portion of said housing and said top wall of said combustion chamber and terminating in an extension portion having an outlet, said diffuser member and said top wall forming a double wall over said combustion chamber; and a filter and coolant chamber surrounding said combustion chamber and communicating therewith, said filter and coolant chamber formed by affixing said flange portion of said top wall to said extension portion of said diffuser member.

3. The gas generator according to claim 2, wherein said top wall is annular and said top portion is formed with a circumferential edge for being affixed to said inner end of said top wall.

4. The gas generator according to claim 2, wherein said bottom wall is a combustor plate with said inner edge welded to said bottom portion of said housing and said outer edge welded to said flange portion.

5. The gas generator according to claim 2, wherein said flange portion includes a free-end portion, said free-end portion being welded to said extension portion of said diffuser member.

6. The gas generator according to claim 2, wherein said filter and coolant chamber includes retaining means positioned between coolant and a filter in said chamber such that gas flow is directed first upon said coolant before passing through said filter.

7. The gas generator according to claim 2, wherein said igniter means is a squib or enhancer.

8. The gas generator according to claim 2, wherein said combustion chamber includes disc-type gas generants housed therein.

9. The gas generator according to claim 2, wherein said diffuser member is laminated at said top portion of said housing and said top wall of said combustion chamber.

10. The gas generator according to claim 2, wherein said diffuser member is a disc-type diffuser.

11. The gas generator according to claim 2, wherein said outlet communicates with an air bag to be inflated by said generator.

12. A gas generator comprising:
a housing having a top portion, a bottom portion, an igniter means mounted therein and means for communicating with the interior of said housing;
a combustion chamber surrounding said housing, said combustion chamber formed by a top wall and a bottom wall, said top wall having an inner end and an outer end, said inner end riveted to said top portion of said housing and said outer end extending to form a flange portion, said bottom wall having an inner edge and an outer edge, said inner edge affixed to said bottom portion of said housing and said outer edge affixed to said flange portion, said combustion chamber communicating with said communicating means;
a diffuser member positioned to cover said top portion of said housing and said top wall of said combustion chamber and terminating in an extension portion having an outlet, said diffuser member and said top wall forming a double wall over said combustion chamber; and
a filter and coolant chamber surrounding said combustion chamber and communicating therewith, said filter and coolant chamber formed by affixing said flange portion of said top wall to said extension portion of said diffuser member.

13. The gas generator according to claim 12, wherein said top wall is annular and said top portion is formed with a circumferential edge for being riveted to said inner end of said top wall.

14. The gas generator according to claim 12, wherein said bottom wall is a combustor plate with said inner edge welded to said bottom portion of said housing, and said outer edge welded to said flange portion.

15. The gas generator according to claim 12, wherein said flange portion includes a free-end portion, said free-end portion being welded to said extension portion of said diffuser member.

16. The gas generator according to claim 12, wherein said filter and coolant chamber includes retaining means positioned between coolant and a filter in said chamber such that gas flow is directed first upon said coolant before passing through said filter.

17. The gas generator according to claim 12, wherein said combustion chamber includes disc-type gas generants housed therein.

18. The gas generator according to claim 12, wherein said diffuser member is laminated at said top portion of said housing and said top wall of said combustion chamber.

19. The gas generator according to claim 12, wherein said diffuser member is a disc-type diffuser.

20. The gas generator according to claim 12, wherein said outlet communicates with an air bag to be inflated by said generator.

* * * * *